United States Patent [19]

Tait et al.

[11] Patent Number: 5,110,278
[45] Date of Patent: May 5, 1992

[54] INJECTION MOLDING APPARATUS FOR PRODUCING A TORIC LENS CASTING MOLD ARBOR

[75] Inventors: John S. Tait; Izi Bruker, both of San Diego, Calif.

[73] Assignee: Pilkington Visioncare, Inc., Menlo Park, Calif.

[21] Appl. No.: 621,449

[22] Filed: Nov. 30, 1990

[51] Int. Cl.⁵ ............................................. B29C 45/33
[52] U.S. Cl. ................................. 425/175; 249/58; 249/144; 249/159; 249/176; 264/2.1; 264/2.5; 264/2.7; 425/180; 425/577; 425/808
[58] Field of Search ............... 264/2.1, 2.5, 2.7, 225; 425/577, 808, 175, 180; 249/53 R, 58, 61, 144, 155, 159, 176

[56] References Cited

U.S. PATENT DOCUMENTS

| | | | |
|---|---|---|---|
| 4,118,898 | 10/1978 | Godot | 51/216 |
| 4,155,962 | 5/1979 | Neefe | 264/1 |
| 4,188,353 | 2/1980 | Neefe | 264/2.5 |
| 4,202,848 | 5/1980 | Neefe | 264/1 |
| 4,229,390 | 10/1980 | Neefe | 264/2.2 |
| 4,239,712 | 12/1980 | Neefe | 264/2.2 |
| 4,441,795 | 4/1984 | Lobdill | 351/169 |
| 4,686,798 | 8/1987 | Petty et al. | 51/216 |
| 4,749,530 | 6/1988 | Kunzler | 264/2.7 |
| 4,854,089 | 8/1989 | Morales | 51/284 |

FOREIGN PATENT DOCUMENTS 0143253 6/1985 European Pat. Off.
59-95118 of 1984 Japan.
2084493 4/1982 United Kingdom.

*Primary Examiner*—Tim Heitbrink
*Attorney, Agent, or Firm*—Charles E. Cates; Frank T. Barber

[57] ABSTRACT

Injection molding methods and apparatus for the production of casting molds for toric lenses having ballast oriented properly with respect to the cylinder axis of the toric surfaces. A calibrated rotatable ring mechanism is used within the injection molding body, for producing a slot or other alignment means on the lens casting mold at a point which is offset a predetermined number of degrees from the axis of the toric surfaces being formed in the casting mold. When the casting mold containing a newly cast lens is mounted on a precision lathe, the mating of the slot with a permanent ridge on the lathe spud ensures that the mold seats on the lathe at the same established place each time with respect to the position of the cutting tool. The offset between the toric axis and the position of the cutting tool has already been established, and therefore there is no need for the lathe operator to make any measurements or resetting of the cutting tool.

6 Claims, 4 Drawing Sheets

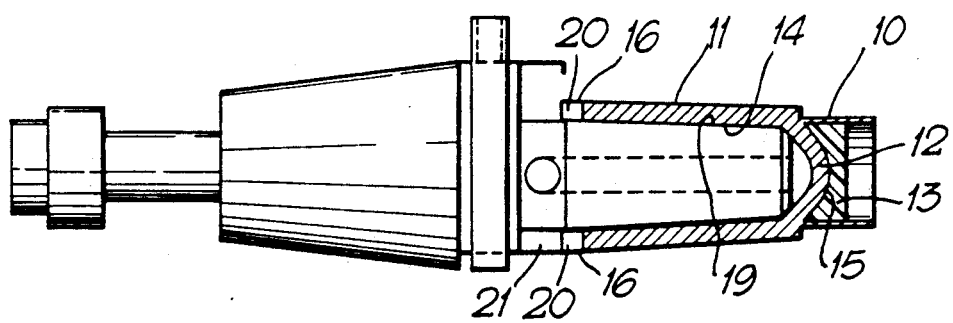
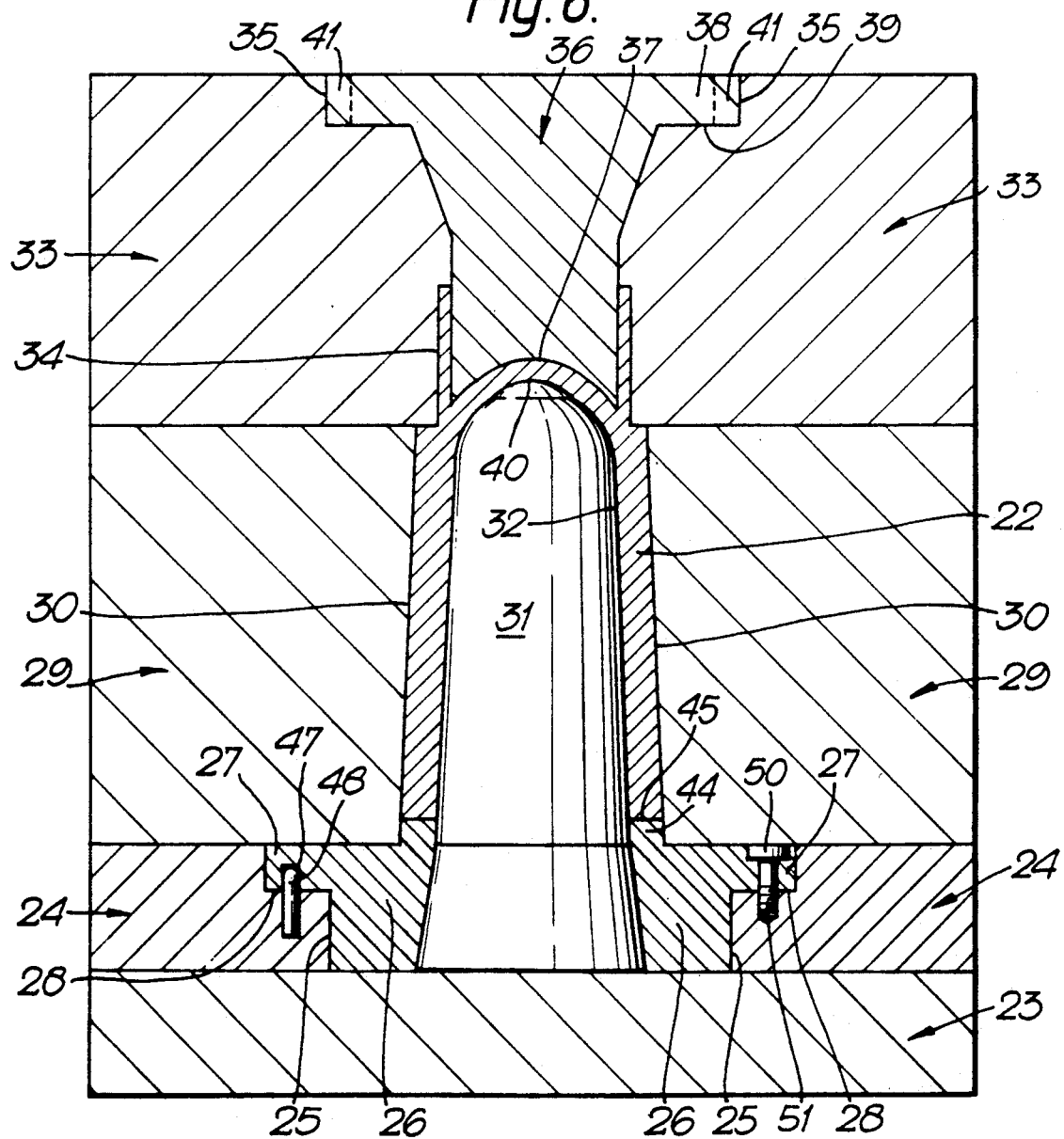

INJECTION MOLDING APPARATUS FOR PRODUCING A TORIC LENS CASTING MOLD ARBOR

FIELD OF THE INVENTION

This invention relates to apparatus and methods for making lens casting molds useful in the production of toric contact lenses. More particularly, the invention relates to the production of casting molds for toric lenses having a ballast oriented properly with respect to the cylinder axis of the toric surface.

BACKGROUND AND PRIOR ART

The normal human cornea of the eye has a generally spherical configuration, and when contact lenses are fitted in such eyes, it is standard procedure to use a lens which has a generally spherical base curve. A complication is introduced when the eye being fitted has corneal toricity, and the toricity is great enough to prevent the use of a standard spherical base curve in the lens.

One of the methods frequently used for overcoming this complication is to provide a lens having a toric curve generally matching the configuration of the toric corneal surface. Another method is to provide a lens having a toric surface as an optical correction on the front surface of the lens. The use of such lenses of course adds another prerequisite to the configuration of the lens—namely, that it be essentially non-rotating in the eye, so that the toric axis in the lens remains aligned with the toric axis of the cornea. A commonly used technique for maintaining this meridional orientation of the lens is to provide the lens with ballast, so that gravity causes the lens to seek a natural position adjacent the bottom eyelid. The use of ballast in turn dictates that the lens be manufactured with a predetermined relationship or offset between the cylinder axis of the toric surface and the orientation of the ballast.

The current commercial procedure for manufacturing lenses of the above nature is heavily dependent on the skill and reliability of the lathe operator, who must make numerous precision measurements and adjustments in the preparation of each individual lens. Thus, for example, in the current procedure for base curve torics, the raw lens button is first sized and then mounted in a lathe collet where a sphere base curve is cut. Following this, the button is crimped (bent in a vise) until the desired toric cylinder is attained, as viewed in a radiuscope, and then the crimped button is ground to a sphere and de-crimped to create the toric surface. Next, the operator aligns the cylinder axis with a radiuscope and marks the button to the desired axis, and finally the button is re-mounted in the lathe collet, where the spherical cut for power and the cut for ballast are performed on the front surface. Mounting and blocking of the button, and use of the radiuscope for creating and marking the toric axis, are steps which demand precision on the part of the operators, and the cumulative effect of variations in each of the steps can easily lead to off-target axes and rejection of the lenses. Further, the stress created on the button during the crimping and decrimping steps results in unavoidable creep which is demonstrated by almost all glassy polymers under stress; hence additional power and cylinder variations are introduced.

When it is considered that lens making companies routinely keep stocks of contact lenses numbering in the tens of thousands, and the lathe operators have a full time job of maintaining such inventories by constant reiteration of the above-described procedure throughout the day for each type of lens produced, it will be understood that eye-strain and fatigue take their toll on the precision and skill of the operators. As a result of all the above factors, current production procedures can yield no more than 5% to 15% on target results for power, axis offset and cylinder.

The prior art includes various approaches for reducing this undesirably high scrap rate. For example, Neefe U.S. Pat. Nos. 4,188,353, 4,229,390 and 4,239,712 describe methods and apparatus for molding, rather than lathing, the base curve of contact lenses. The procedure involves casting a liquid monomer in a plastic cup-like molding cavity having the desired base curve in the bottom, polymerizing the monomer to form a lens button with the base curve thus formed, and then using the mold, with the lens button still retained, as a lathe arbor to machine the desired convex curves on the anterior surface of the lens. The procedure partially reduces the work-load of the lathe operator, since the precision steps of sizing, crimping and grinding to sphere are accomplished in the molding step rather than in the lathing. However, if the procedure is applied to the production of lenses with toric base curves, no means are provided for locating the toric axis or orienting it with respect to the axis of the ballast. The operator must still, with respect to each individual lens, use the radiuscope to locate and mark the toric axis, and then make the necessary lathe adjustments for each lens before performing the desired power and ballast cuts.

Kunzler U.S. Pat. No. 4,749,530 suggests an improvement over the above, involving modification of the cup-like molding cavity to include a hollow hemispherical base having one or more key ways or slots on the exterior surface. After liquid monomer is polymerized in the cup-like cavity to produce a lens blank having the desired base curve, the mold containing the lens blank is placed on a lens generating lathe having a hemispherical shaped locating ring, in such manner that the key way on the exterior surface of the mold base mates with a guide key on the locating ring of the lathe. In this manner, the location of the posterior lens surface curves is established when the mold is mounted on the lathe. Thus, the hemispherical-shaped locating ring of the lathe can be set at one position, and the front surfaces of successive similar lenses can be cut without remeasuring the base curve axis and resetting the cutting tool for each lens. However, this approach still requires lathe operator intervention when switching between lenses having different toric axes, since the hemispherical-shaped locating ring of the lathe must be reset for each axis. Although this may be useful when limited numbers of different lenses are being produced, it presents an inefficiency and an opportunity for operator error in large volume production or when automated production lines are desired. In addition, Kunzler's design is limited to lenses requiring small amounts of prism ballast. Thus, an operation involving double slab off ballast cannot be done by Kunzler.

It is an object of the present invention to provide a method for producing toric base curve lens casting molds, which method allows all toric base curve cutting, measuring and alignment steps to be transferred from the lathe operator to a preliminary automatic injection molding procedure in which no operator dependent determinations are required.

It is a further object of the invention to provide for the production of toric base curve lens casting molds which eliminate the need for lathe re-setting between batches of lenses having differing toric axes.

It is another object of the invention to provide for the production of toric base curve lens casting molds having lathe alignment means permitting an automated lathing operation in which successive batches of lenses having differing ballast to toric axis orientation may be machined on their front surfaces without making any readjustments on the lathe.

It is a still further object to provide injection molding apparatus for accomplishing the above.

Other objects and advantages will be apparent from the following description and drawings.

SUMMARY OF THE INVENTION

The present invention relates to an injection molding method and apparatus for the production of toric base curve lens casting molds. The invention includes the use of a calibrated rotatable ring mechanism within the injection molding body, for producing a slot or other alignment means on the lens casting mold at an axis which is offset a predetermined number of degrees from the axis of the toric curve being formed in the casting mold. When the casting mold containing a newly cast lens is mounted on the precision lathe, the mating of the slot with a permanent ridge on the lathe spud ensures that the mold seats on the lathe at the same established place each time with respect to the position of the cutting tool. The offset between the toric axis and the position of the cutting tool has already been established, and therefore there is no need for the lathe operator to make any measurements or resetting of the cutting tool. The lathe tool remains in a permanent position for making the ballast and other cuts on successive batches of lenses, even though the toric axis offset may vary from batch to batch, because the offset is built into the casting mold arbor used for each batch.

The present invention is therefore described as a method for producing a lens casting mold arbor which has a hollow, cup-like top portion, a hollow lathe mounting bottom portion and a partition element separating the said top and bottom portions. A toric surface is formed on the partition element in the bottom of the cup-shaped container, and alignment means are formed in the bottom lathe mounting portion on an axis which is offset a predetermined number of degrees from the toric axis of the said toric surface.

The injection molding method for producing the above lens casting mold arbor comprises the steps of (1) providing an injection molding cavity which defines the lateral surfaces, the top edge surface and the toric surface of the arbor; (2) providing a rotatable ring plate element which defines the bottom edge surface of the arbor, said ring plate having the negative of at least one alignment means in its upper surface for forming the positive of said alignment means (e.g., a slot or a lug) in the bottom end of the arbor; (3) rotating and locking the ring plate element at a point where the alignment means in the ring plate element is offset a predetermined number of degrees from the toric axis of the said toric surface; and (4) introducing resinous molding material into the said cavity and applying heat and pressure to produce a lens casting arbor having an alignment slot or other means in its bottom end surface, offset a predetermined number of degrees from the toric axis of its toric surface.

The injection molding apparatus of the invention comprises (1) an injection molding body having an interior opening shaped to form the exterior lateral surface of the said arbor; (2) a first core pin inserted in the bottom portion of the interior opening of the said molding body, the external surface of the core pin being spaced apart from the surface of the interior opening of the molding body to provide a cavity having the shape of the lower portion of the said arbor; (3) a toric core pin having the positive of a toric lens curve on its bottom end, said toric core pin being inserted in the upper portion of the interior opening of the molding body and having its external lateral surface spaced apart from the interior lateral surface of the molding body to provide a cavity having the shape of the upper portion of said arbor, and the toric lower end of the toric pin being spaced apart from the upper end of the first core pin to provide a cavity having the shape of the partition element separating the upper and lower portions of the said arbor; (4) alignment means formed in the toric pin for mating with corresponding alignment means in the upper portion of the molding body, whereby the toric axis of the toric pin is maintained in a stationery position; (5) a rotatable ring plate inserted in the molding body for forming the bottom end surface of said arbor, said rotatable ring plate having the negative of at least one alignment means in its upper surface for forming the positive of said alignment means in the bottom end surface of said arbor; (6) means for rotating and locking the rotatable ring plate at a point where the alignment means in the ring plate is offset a predetermined number of degrees from the toric axis of the toric pin; and (7) means for introducing resinous molding material into said cavities and applying heat and pressure to produce the said lens casting arbor.

BRIEF DESCRIPTION OF THE DRAWINGS

The objects, features and advantages of the invention will be apparent to those skilled in the art from the following detailed description, taken together with the accompanying drawings, in which:

FIG. 5 is a longitudinal section of a precision lathe spindle having the toric casting mold arbor mounted on the spud thereof.

FIG. 6 is a longitudinal section of the injection molding apparatus of the present invention.

DETAILED DESCRIPTION OF THE INVENTION

Figure 1:
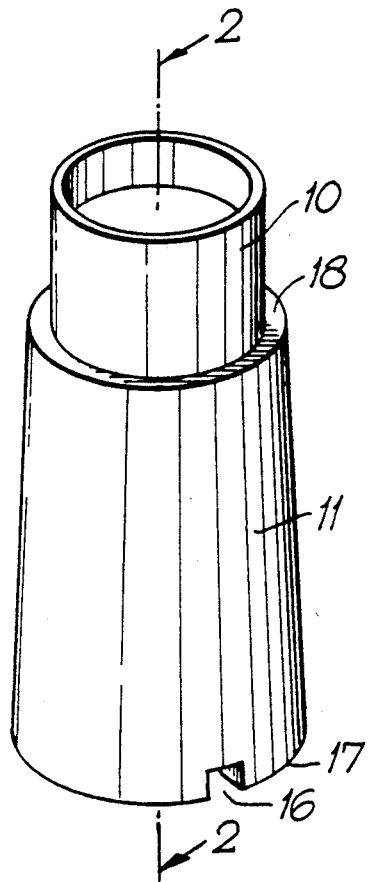
FIG. 1 is a perspective view of the toric casting mold arbor of the present invention, showing an alignment slot in its lower edge.
Figure 2:
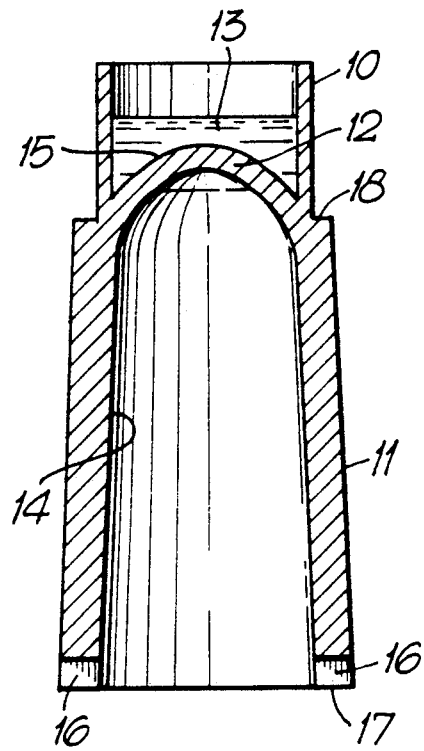
FIG. 2 is a longitudinal section of the arbor, taken along line 2—2 of FIG. 1.
Figure 3:
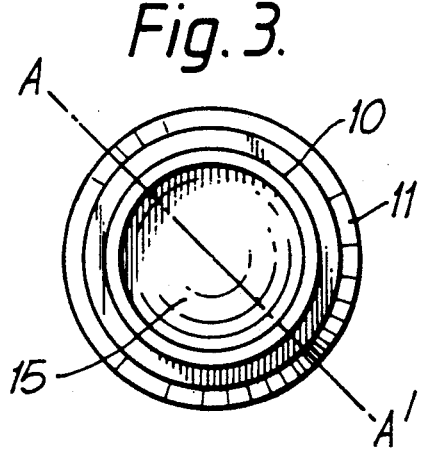
FIG. 3 is a top view of the arbor, showing the bottom of the cup-shaped container, with the toric curve aligned along line A—A'.

The toric lens casting mold arbor produced by the method and apparatus of the present invention is illustrated in FIGS. 1 through 4. The arbor is comprised essentially of a hollow top portion 10 and a hollow bottom portion 11, separated by a partition member 12. The top portion 10 comprises a cup-shaped container in which the optical lens blank 13 may be cast and cured. The hollow bottom portion 11 serves as a lathe-mounting member and has a precision taper on its inside surface 14 designed to mate with a matching taper on a lathe spud.

Figure 4:
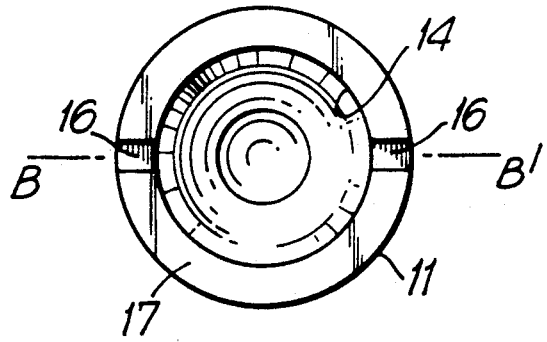
FIG. 4 is a bottom view of the arbor, showing the alignment slots in the bottom edge.

A precision toric base curve 15 is formed in the bottom of cup 10—i.e., on the top surface of the partition member 12. The toric curve 15 in the bottom of cup 10 is viewed from the top in FIG. 3, prior to casting of the lens button, with the line A—A' generally indicating the location of the toric axis. Alignment slots 16 are formed in the hollow bottom portion which serves as bottom edge 17 of the lathe mounting member 11. As best shown in FIG. 4, the alignment slots 16 may be placed at any desired location around the circumference of bottom edge 17, so that the axis line B—B' drawn through them can form any desired or predetermined offset angle with respect to the toric axis A—A' shown in FIG. 3. The casting mold arbor contains a step 18 which is designed to cooperate with an LVDT on the lathe to determine the base-line height from which the target center thickness of the lens button is calculated.

The toric casting mold arbor shown in FIGS. 1 through 4 is used for the production of lens buttons having a precision toric base curve and a generally flat front surface, which is ready for lathe cutting of the desired anterior power and ballast curves while the button is still retained within the mold. Production of the lens button is initiated by filling the cup-shaped mold 10 with a liquid or syrup monomer material containing a suitable polymerization catalyst. The casting liquid may be any of the conventional monomers and mixtures thereof which are known in the art for the production of hard or soft contact lenses, such as acrylic esters, hydrophilic and hydrophobic monomer mixtures, silicone elastomers, cellulose esters, and the like. After the lens forming liquid and catalysts are filled into the casting mold 10, polymerization is initiated and completed under appropriate known curing conditions, which include curing in an oven or the use of other techniques such as radiation, including U.V. and microwave and the use of a bath with a heat transfer fluid, such as water and silicone oil.

After curing and stabilizing of the lens blank, the toric casting mold arbor, with the lens button still retained therein, is next mounted on a precision lathe for cutting the front surfaces. As shown in FIG. 5, the arbor is mounted in such manner that its interior tapered surface 14 mates with the exterior tapered surface 19 of the lathe spud, and the alignment slots 16 on the bottom edge 17 of the arbor portion 11 mate with the alignment lugs 2 of the alignment ring 21 of the lathe.

With the arbor mounted as in FIG. 5, the front surface of the lens blank may be machined by the lathe cutting tool (not shown) to provide the desired power and ballast curves. In the process of generating the front optical surfaces, the lens blank 13 is held securely by the lens mold 10, and both the lens blank and the side walls of the lens mold, being made of plastic, are cut simultaneously. It is a feature of the casting mold arbor produced by the present invention that it is not necessary to measure the lens for toric axis or reset the lathe tool to obtain the desired offset between the toric axis and the ballast cut. The lathe tool may be allowed to remain in a fixed position, as far as the toric axis is concerned, regardless of what offset angle is desired, because the offset angle has been predetermined by prior location of the alignment slots 16 in the injection molding production of the mold arbor itself. Thus the entire error-prone lathe operator procedure with respect to the toric feature has been transferred away from the operator to a precision injection molding operation, in which operator skill and fatigue are not involved. The precision injection molding method and apparatus of the present invention are described in the sections to follow.

FIG. 6 is a schematic sectional view of the injection molding apparatus. Although not limited to the arrangement shown, it is the preferred embodiment of the invention that the injection molding body be an assembly of plates or cartridges which are inserted into a frame and locked together to form the desired mold cavity 22. As shown, the apparatus includes a base plate 23 and, immediately above it, a first molding body plate 24 which has an interior opening whose lateral surface is shown at 25. The plate 24 serves as a seat for a rotatable ring plate 26, which has a flange 27 adapted to seat on shoulder 28 of plate 24. Located on top of first plate 24 is a second molding body plate 29 having an interior opening whose lateral internal surface is shown at 30. The interior opening of the second plate 29 is in registration with the interior opening of first plate 24, and the lateral internal surface 30 of plate 29 is shaped to form the exterior lateral surface of the bottom portion of the arbor to be formed in cavity 22.

A first core pin 31 is located within the interior openings of the first and second molding body plates 24 and 29, the external surface 32 of core pin 31 being spaced apart from the internal lateral surface 30 of body plate 29 to provide the shape of the lower portion of cavity 22. The core pin 31 may, if desired, be fixed to base 23, since the pin has a permanent, unchanging external configuration and does not need to be changed from one batch to another.

Figure 7:
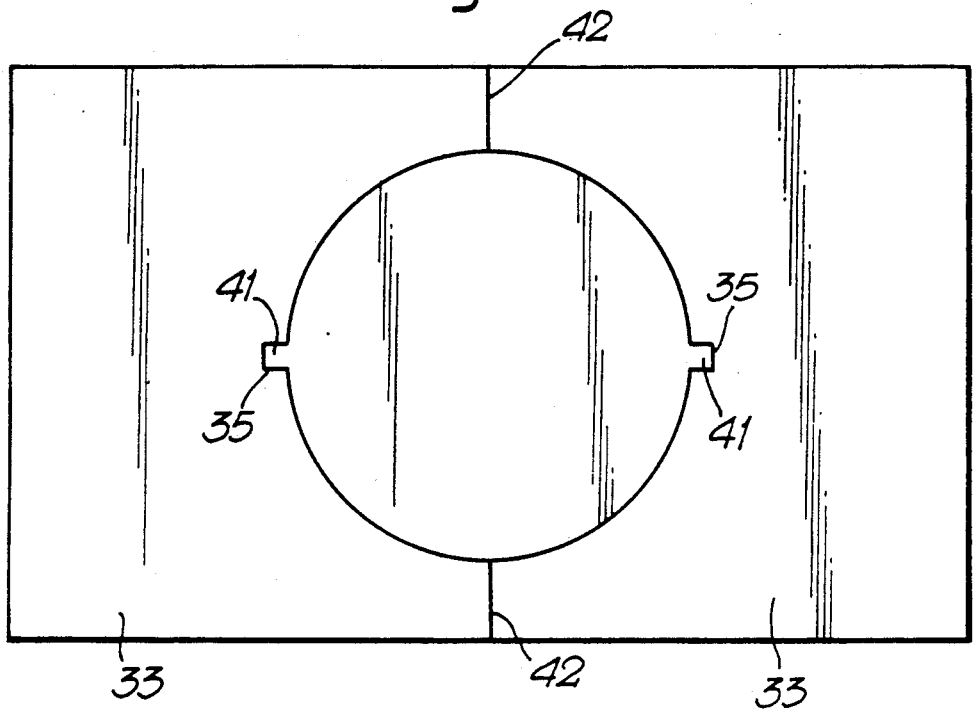
FIG. 7 is a top view of the injection molding apparatus, with the toric core pin in place, showing the timing pins aligning the core pin and the injection molding body.

Located on top of second body plate 29 is a third molding body plate having an interior opening whose lateral internal surface is shown at 34. The interior opening of the third plate 33 is in registration with the interior openings of first and second plates 24 and 29, and the lateral internal surface 34 of plate 33 is shaped to form the exterior lateral surface of the top, cup-shaped portion of the arbor to be formed in cavity 22. Plate 33 has timing slots 35, best shown in FIG. 7, for mating with alignment lugs on the toric core pin, to be described.

Adapted for insertion into the interior opening of body plate 33 is a toric core pin 36 having the positive of a toric lens curve on its bottom end 37. The core pin 36 has a diameter at its lower end which is slightly less than the diameter of the interior opening in body plate 33 at that point, so that the external lateral surface of the core pin 36 is spaced apart from the interior lateral surface 34 of the plate 33 to provide the shape of the upper, cup-shaped portion of cavity 22. The toric core pin 36 has a flange 38 which rests on shoulder 39 of body plate 33, so that the toric lower end 37 of core pin 36 is spaced apart from the upper end 40 of first core pin 31 to provide a cavity having the shape of the partition element separating the upper and lower portions of the arbor to be formed in cavity 22. The toric pin 36 is also provided with timing or alignment lugs or ridges 41 adapted for mating with timing slots 35 in the body plate 33, to provide centration of toric base curve axis to pin axis for location in the injection mold.

Figure 8:
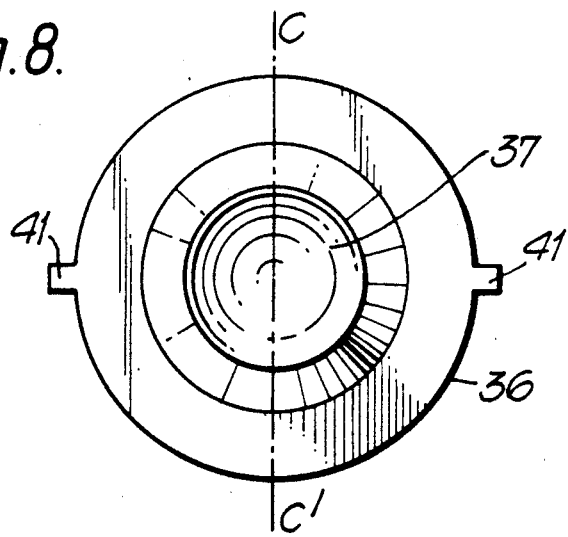
FIG. 8 is a bottom view of the toric core pin, showing the toric axis in the bottom end, and its relationship to the timing pins.

The toric core pin 36 is made of metal, such as stainless steel, nickel or nickel alloy, or any other suitable permanent material, and has a concave toric end surface 37. The toric surface may be produced by known manufacturing procedures, including for example lathe machining followed by polishing; electroforming; or electro discharge machining followed by polishing. It is essential in any of such manufacturing procedures that the toric axis of the concave curve produced in the bottom end of the pin be precisely aligned with the timing lugs or ridges 41 of the core pin. As shown in FIG. 8, which is a view of the bottom end of the core pin 36, the toric axis C—C' must be aligned in a permanent relationship to the lugs 41, so that when the toric pin is inserted in the opening of body plate 33, the toric axis on the concave surface 37 is always aligned in the same direction.

As previously mentioned, the injection molding body may be an assembly of plates or cartridges which are inserted into a frame and locked together to form the desired mold cavity 22.

Figure 9:
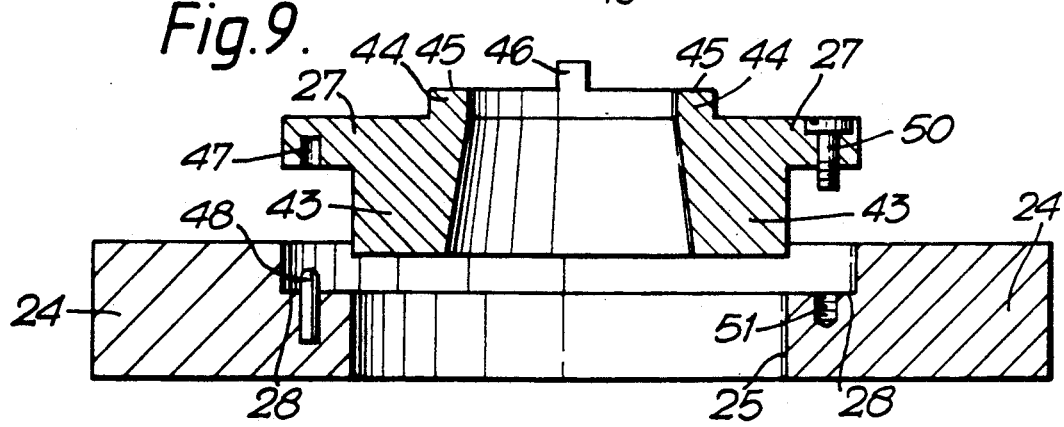
FIG. 9 is an enlarged and exploded sectional view of the rotatable ring plate, ready to be dropped into position in the base plate of the injection molding apparatus.
Figure 10:
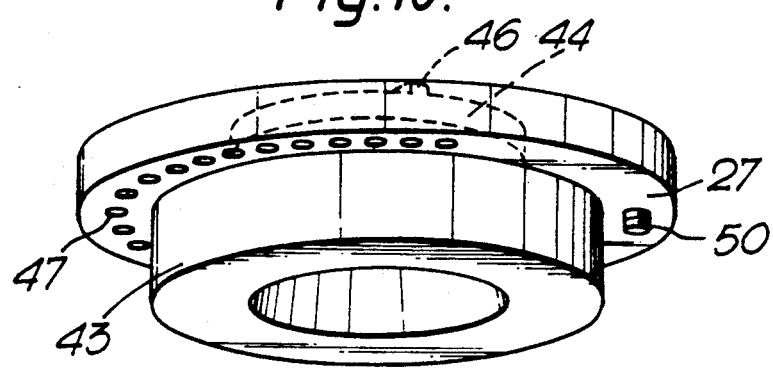
FIG. 10 is a perspective bottom view of the rotatable ring plate, showing the indexed location holes.
Figure 11:
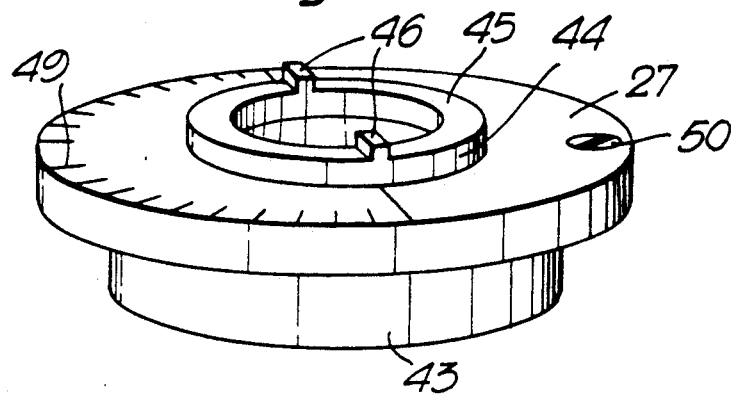
FIG. 11 is a perspective top view of the rotatable ring plate, showing the shoulders in the upper edge for forming the alignment slots in the bottom edge of the casting mold arbor.

The rotatable ring plate 26 forms an essential feature of the invention and provides a means for forming the alignment slots 16 at a predetermined position in the bottom end 17 of the molding arbor. As illustrated in FIG. 6, and in more detail in FIGS. 9 through 11, the ring plate 26 is made up of a tubular body section 43, a flange 27, and a cylindrical shoulder 44. The flange 27 is adapted to seat on the shoulder 28 of the first body plate 24, and the opening in the ring plate 26 is designed to fit around the first core pin 31. The top surface 45 of the cylindrical shoulder 44 forms the bottom end 17 of the casting mold to be formed in the cavity 22. Alignment forming lugs 46 are positioned on the top surface 45 of the cylindrical shoulder 44, and it will be seen that these lugs protrude into the cavity 22 and result in corresponding slots 16 in the bottom edge 17 of the finished form of the casting mold arbor to be produced in cavity 22.

A series of locater holes 47 are positioned around the bottom circumference of flange 27, extending as much as 180 degrees around the flange. These holes are adapted to mate with a locater pin 48 fixed in body plate 24 at the place indicated. The upper surface of flange 27 carries calibration indicia 49 corresponding to the positions of the locater holes 47 in the bottom of the flange.

When the injection molding body is being assembled, the first mold body plate 24, which serves as a seat for the rotatable ring plate 26, is placed on top of the base plate 23 and over the core pin 31. The mold operator then reads the prescription specifying the number of degrees the toric axis is to be offset from the orientation axis of the prism or other ballast and drops the rotatable ring 26 into place on mold body plate 24, so that the hole 47 corresponding to the specified number of degrees mates with the locater pin 48. Optionally, the ring plate 26 may be locked in place by use of a set screw 50 and corresponding slot 51. Following this, the second and third body plates 29 and 33 are inserted in the injection molding frame, and finally the toric core pin 36 is placed in position, with the timing lugs 41 mating with timing slots 35. It is a feature of the invention that the timing slots 35 and the locater pin 48 are permanently fixed in the injection molding body, in a precision relationship with each other, so that when the rotatable ring 26 is seated with locater pin 48 engaging a hole 47 corresponding to a desired toric axis offset, the slots 16 in the bottom edge of the mold arbor will always provide the prescribed number of degrees of offset between the toric axis and the ballast orientation axis of the lens produced on the mold arbor.

When the injection mold has been assembled as described, a molding grade resinous material such as polyimide, polycarbonate, polymethylpentene, polyethylene, polypropylene, or other molding material is introduced into the cavity 22 through injection means (not shown), and standard injection molding techniques are used to apply the necessary heat and pressure to produce the desired casting mold arbor. After appropriate cooling and stabilization, the arbor is ready to be filled with monomer and cured to produce the lens button, in the manner previously described.

The production of toric base curve contact lenses, using casting mold arbors produced by the present invention, provides numerous advantages and efficiencies, as compared to current commercial procedures. The number of manufacturing operations is reduced dramatically. All the lathe operator-dependent determinations involved in the current procedures for making toric base curve lenses are transferred to the injection molding stage, where the base curves and axis offsets are permanently established by the injection molding equipment itself, rather than by operator adjustment. The errors introduced by plastic flow of the lens polymer in the crimped state are avoided. The variations and the resulting high reject rate caused by lathe operator eye strain and fatigue in cutting, polishing, and measuring the back and front surface curves and setting and resetting the lathe tool, are eliminated. The lathe tool remains in a permanent position for making the ballast and other cuts on successive batches of lenses, even though the toric axis offset may vary from batch to batch, because the offset is built into the casting mold arbor used for each batch. Scrap rates are reduced from the current 85–95% to only about 50%.

Figure 12:
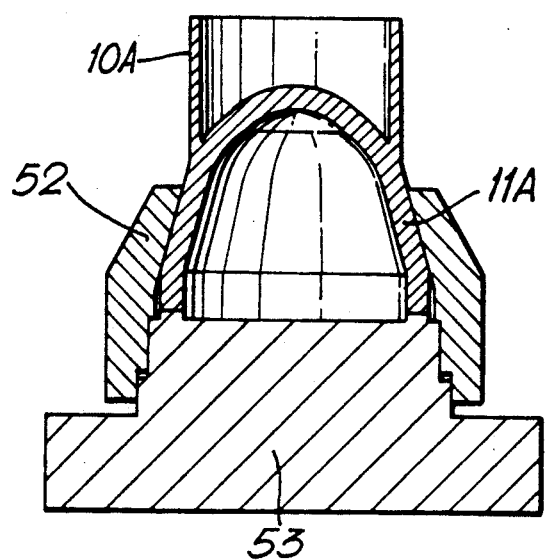
FIG. 12 is a longitudinal section of an alternative embodiment of the casting mold arbor, having the lathe-mounting taper on the outside.

Although preferred embodiments of the invention have been described in detail, it will be understood by those skilled in the art that variations may be made thereto without departing from the spirit of the invention. For example, the toric core pin 36 may have the positive of a front surface toric curve on its bottom end 37, so that the resulting casting mold arbor may be used to produce lenses with a molded front toric surface, rather than the molded base toric surface shown in the drawings. As a further example, the casting mold arbor may be made in the shape illustrated in FIG. 12, wherein the hollow bottom portion 11A is configured with the lathe mounting taper on the outside surface, for mating with a cap 52 on a lathe spud 53.

What is claimed is:

1. Injection molding apparatus for producing a lens casting mold arbor, said arbor having i. hollow top and bottom portions separated by a finished element;
ii. exterior and interior lateral surfaces; and
iii. a bottom end surface carrying at least one alignment means for aligning said arbor on a lathe;

said injection molding apparatus comprising:

a. an injection molding body having an interior opening with a surface corresponding to said exterior lateral surface of said arbor;

b. a first core pin inserted in a bottom portion of said interior opening in said molding body, said first core pin having an external lateral surface corresponding to said interior lateral surface of said bottom portion of said arbor, said first core pin being spaced apart from said surface of said interior opening in said molding body to provide a cavity having the shape of said bottom portion of said arbor;

c. a toric core pin inserted in the upper portion of said interior opening of said molding body, said toric core pin having a bottom end shaped in the form of a toric lens curve having a predetermined toric axis, said toric core pin having an exterior lateral surface corresponding to said interior lateral surface said top portion of said arbor, said toric core pin being spaced apart from said surface of said interior opening of said molding body to provide a cavity having the shape of said top portion of said arbor, and being spaced apart from the upper end of said first core pin to provide a cavity having the shape of said finished element separating said top and bottom portions of said arbor;

d. alignment means formed in said toric core pin for mating with corresponding alignment means in the upper portion of said molding body, whereby said toric axis of said toric core pin is maintained in a stationary position;

e. a rotatable ring plate inserted in said molding body for forming said bottom end surface of said arbor, said rotatable ring plate having an upper surface corresponding to said bottom end surface of said arbor and having at least one alignment means in its said upper surface for forming said at least one alignment means in said bottom end surface of said arbor;

f. means for rotating and locking said rotatable ring plate at a point where said at least one alignment means in said ring plate is offset a predetermined number of degrees from said toric axis of said toric pin, whereby said at least one alignment means in said bottom end surface of said arbor will be offset a corresponding number of degrees from said toric axis; and g. means for introducing resinous molding material into said cavities and applying heat and pressure to said molding material to produce said lens casting arbor.

2. The injection molding apparatus of claim 1 wherein said molding body is provided with a fixed locator pin and said rotatable ring plate is provided with a series of spaced holes around at least a portion of its circumference, said holes being adapted to mate with said locator pin in said molding body.

3. The injection molding apparatus of claim 1 wherein said alignment means in said upper surface of said rotatable ring plate is a ridge, and wherein said alignment means in said bottom end surface of said arbor is a slot.

4. Injection molding apparatus for producing a lens coating mold arbor, said arbor having i. hollow top and bottom portions separated by a finished element;
ii. exterior and interior lateral surfaces; and
iii. a bottom end surface carrying at least one alignment means for aligning said arbor on a lathe;

said injection molding apparatus comprising:

a. a first molding body plate having an interior opening and serving as a base plate;

b. a second molding body plate, located above said first plate, having an interior opening with a lateral surface corresponding to said exterior lateral surface of said bottom portion of said arbor, said interior opening in said second molding body plate being in registration with said opening in said first plate;

c. a first core pin inserted in said openings of said first and second plates, said first core pin having an external lateral surface corresponding to said interior lateral surface of said bottom portion of said arbor, said first core pin being spaced apart from said lateral surface of said interior opening of said second molding body plate to provide a cavity having the shape of said bottom portion of said arbor;

d. a third molding body plate, located above said second plate, having an interior opening with a lateral surface corresponding to said exterior lateral surface of said top portion of said arbor, said interior opening in said third molding body plate being in registration with said interior openings in said first and second plates;

e. a toric core pin inserted in said interior opening of said third molding body plate, said toric core pin having a bottom end shaped in the form of a toric lens curve having a predetermined toric axis, said toric core pin having an exterior lateral surface corresponding to said interior lateral surface of the said top portion of said arbor, said toric core pin being spaced apart from said surface of said interior opening of said third molding body plate to provide a cavity having the shape of said top portion of said arbor, and said bottom end of said toric core pin being spaced apart from the upper end of said first core pin to provide a cavity having the shape of said finished element separating said top and bottom portions of said arbor;

f. at least one alignment ridge formed in said toric pin for mating with a corresponding alignment slot in said third plate, whereby the toric axis of said toric pin is maintained in a stationary position;

g. a rotatable ring plate inserted in said first plate for forming said bottom end surface of said arbor, said rotatable ring plate having an upper surface corresponding to said bottom end surface of said arbor and having at least one ridge in its said upper surface for forming an alignment slot in said bottom edge surface of said arbor;

h. means for rotating and locking said rotatable ring plate at a point where said ridge in said ring plate is offset a predetermined number of degrees from the toric axis of said toric pin, whereby said alignment slot in said bottom end surface of said arbor will be offset a corresponding number of degrees from said toric axis; and i. means for introducing resinous molding material into said cavities and applying heat and pressure to said molding material to produce said lens casting arbor.

5. The injection molding apparatus of claim 4 wherein said first molding plate is provided with a fixed locator pin and said rotatable ring plate is provided with a series of spaced holes around at least a portion of its circumference, said holes being adapted to mate with said locator pin in said first molding plate.

6. The injection molding apparatus of claim 4 wherein said first, second and third molding plates are comprised of multiple sections which may be assembled and locked into place to provide a unitary molding body.

* * * * *